United States Patent [19]

McIvor-Dean et al.

[11] Patent Number: 5,467,723

[45] Date of Patent: Nov. 21, 1995

[54] COMBINED CULTIVATOR AND FLUID INJECTOR SYSTEM

[75] Inventors: Alan McIvor-Dean, Downham Market; Murree Groom, King's Lynn, both of Great Britain

[73] Assignee: Christopher Robin Knights, Norfolk, United Kingdom

[21] Appl. No.: 39,311

[22] PCT Filed: Aug. 27, 1991

[86] PCT No.: PCT/GB91/01435

§ 371 Date: Apr. 15, 1993

§ 102(e) Date: Apr. 15, 1993

[87] PCT Pub. No.: WO92/03045

PCT Pub. Date: Mar. 5, 1992

[30] Foreign Application Priority Data

Aug. 25, 1990 [GB] United Kingdom ............... 9018728

[51] Int. Cl.[6] ................................. A01C 23/00
[52] U.S. Cl. ................ 111/123; 111/118; 111/121
[58] Field of Search .................... 111/118, 120, 111/121, 123, 156; 172/21

[56] References Cited

U.S. PATENT DOCUMENTS

| | | | |
|---|---|---|---|
| 3,811,387 | 5/1974 | Meiners. | |
| 4,538,532 | 9/1985 | Coker | 111/121 |
| 4,656,957 | 4/1987 | Williamson et al. | 111/121 |
| 4,762,075 | 8/1988 | Halford | 111/156 X |
| 4,849,219 | 7/1989 | Staub et al. | 424/605 |
| 4,872,412 | 10/1989 | Zollinger | 111/121 |
| 4,942,833 | 7/1990 | Hill et al. | 111/121 |
| 4,985,200 | 1/1991 | Johnston | 111/121 X |
| 4,987,841 | 1/1991 | Rawson et al. | 111/121 |
| 4,998,488 | 3/1991 | Hansson | 111/121 X |

FOREIGN PATENT DOCUMENTS

| | | | |
|---|---|---|---|
| 322941 | 7/1989 | European Pat. Off. . | |
| 1270715 | 7/1961 | France . | |
| 1454990 | 10/1966 | France . | |
| 2619670 | 3/1989 | France . | |
| 1323002 | 7/1987 | U.S.S.R. | 111/121 |
| 1503700 | 8/1989 | U.S.S.R. | 111/121 |
| 430347 | 6/1991 | U.S.S.R. | 111/121 |

*Primary Examiner*—John A. Ricci
*Attorney, Agent, or Firm*—Galgano & Burke

[57] ABSTRACT

A cultivator-injector machine for sub-surface application of fluid to a field which machine includes a chassis carrying one or more tines, each tine having one or more fluid delivery pipe(s) mounted extending longitudinally down a rearward, in use, face thereof, each delivery pipe having a closed lower end and one or more lateral apertures therein, the chassis further carrying one or more free-turning cutting discs, each mounted closely in front of and substantially aligned with a respective tine along the axis of ploughing motion of the machine.

16 Claims, 2 Drawing Sheets

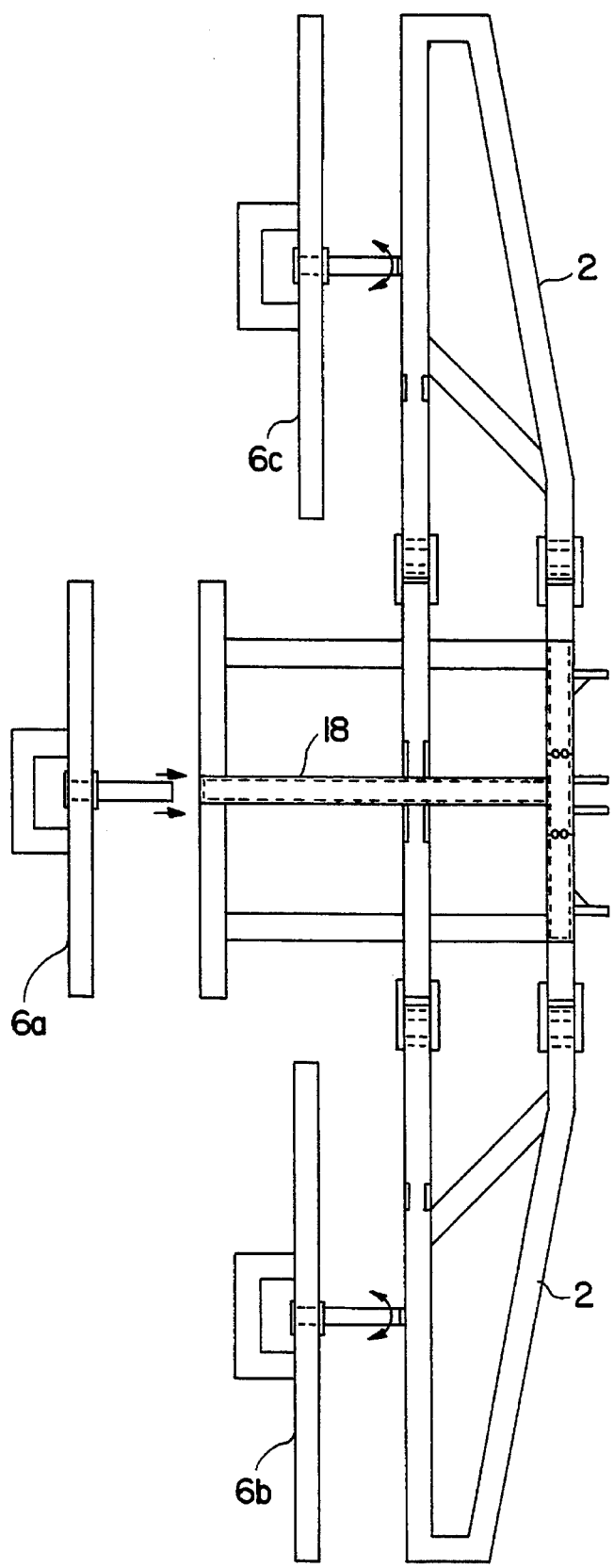

COMBINED CULTIVATOR AND FLUID INJECTOR SYSTEM

FIELD OF THE INVENTION

The present invention relates to a combined cultivator and fluid injector and a method of use thereof.

REVIEW OF MOST RELEVANT ART KNOWN TO THE APPLICANT

The application of agrochemicals, such as pesticides and herbicides, to agricultural land is most commonly achieved by aerial or ground-based spraying. The agrochemicals are delivered generally in aqueous solution under pressures of 3–4 bars to achieve effective high rates of application. Whilst this system can be particularly suitable for application of insecticides, it does not provide optimal targeting for pesticides against subterranean plant pathogens and those herbicides and other agrochemicals, such as systemic insecticides, which act only after being taken up by the roots of plants. This poor targeting efficiency is not only wasteful of the agrochemicals and water, it also exacerbates the hazards posed to the user and to the environment by the agrochemicals.

Cultivator machines for vertical gravity-fed delivery of agrochemicals into the ground are known of. Such machines generally comprise a chassis bearing a number of tines, each tine having a pipe running down its rearward, in use, face for vertical delivery of the agrochemicals into the furrow directly behind the tine. These machines are essentially capable only of treatment of a field before or during sowing or planting of a crop and cannot subsequently be used to provide further doses of agrochemicals to the growing crop.

It is a general objective of the present invention to provide a combined cultivator-injector which overcome this profound problem and in so-doing offers a number of significant further advantages over conventional apparatus and techniques.

SUMMARY OF THE INVENTION

According to a first aspect of the present invention there is provided a cultivator-injector machine for sub-surface application of a fluid pesticide to a field which machine comprises; a chassis carrying one or more tines, each said tine having one or more fluid delivery pipe(s) mounted extending longitudinally down a rearward, in use, face thereof, each said delivery pipe having a closed lower end and one or more lateral apertures therein facing rearwardly, in use, at an angle to the axis or ploughing motion, said chassis further carrying one or more free-turning cutting discs, each mounted closely in front of a substantially aligned with and substantially aligned with a respective tine along the axis of ploughing motion of the machine, characterised in that the machine is adapted for repeated passage through a field of root crop as the crop grows, the tines being substantially straight and the machine being mounted to the front of a powered vehicle, in use.

Preferably each said lateral aperture is located at predetermined height on the delivery pipe relative to the tip of the corresponding tine.

Preferably each said lateral aperture is located facing rearwardly, in use, on the delivery pipe at an angle of between 45 degrees and 75 degrees to the axis of ploughing motion.

Preferably each tine is a vertical tine (i.e extends substantially perpendicular to the ground, in use).

Preferably the delivery pipe fitted to the tine is no more than 25 mm in diameter.

Suitably the lateral apertures of the delivery pipe are less than 2 mm in diameter.

Each cutting disc is preferably planar.

Most suitably the mounting of the cutting disc to the chassis enables the disc to be adjustably positioned relative to the respective tine.

Suitably the disc is adjustably biased into the ground, in use.

According to a second aspect of the present invention thee is provided a method of sub-surface application of fluid to a field which method comprises:

1. Providing a cultivator-injector machine of the first aspect of the invention.
2. Communicating the delivery pipe(s) with a pressurised supply of fluid.
3. Moving the chassis across a field with the cutting disc(s) parting obstructive vegetation/detritus ahead of the tine(s) with the tine(s) ploughing the soil and with the delivery pipe(s), via the lateral apertures therein, injecting fluid into the soil ridges.

Preferably in step 3 of the method the tine(s) are set to a predetermined depth in the ground to optimise targeting of the fluid.

BRIEF DESCRIPTION OF THE DRAWINGS

FIG. 4 is a plan view of the chassis of the machine of FIG. 1.

FIG. 5 is a rear elevation of the chassis shown in FIG. 4.

DESCRIPTION OF THE PREFERRED EMBODIMENT

Figure 1:
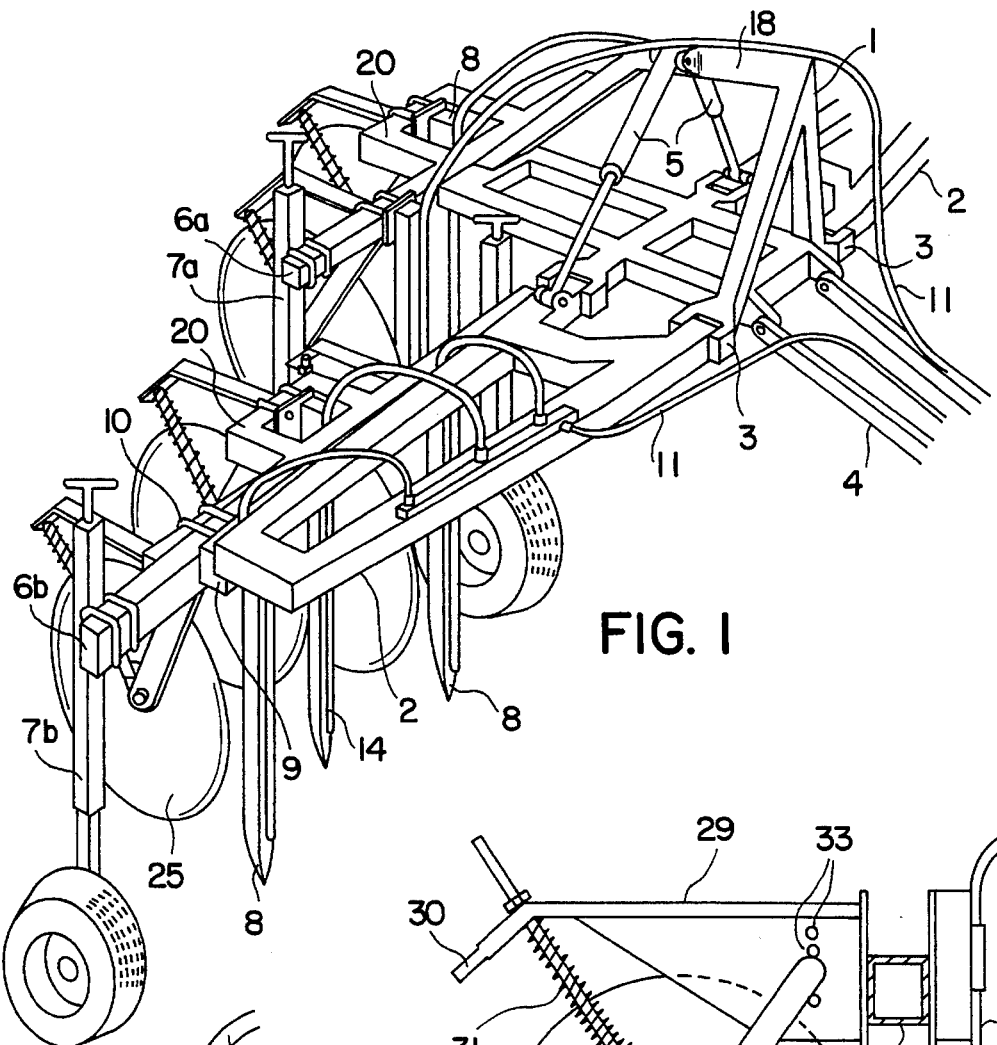
FIG. 1 is a schematic perspective view of a preferred embodiment of cultivator-injector machine.
Figure 3:
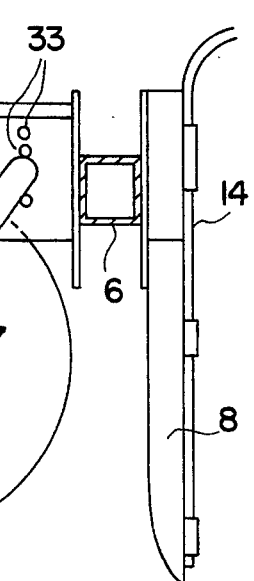
FIG. 3 is a sectional view similar to that of FIG. 2 but showing the associated cutting disc in place.
Figure 2:
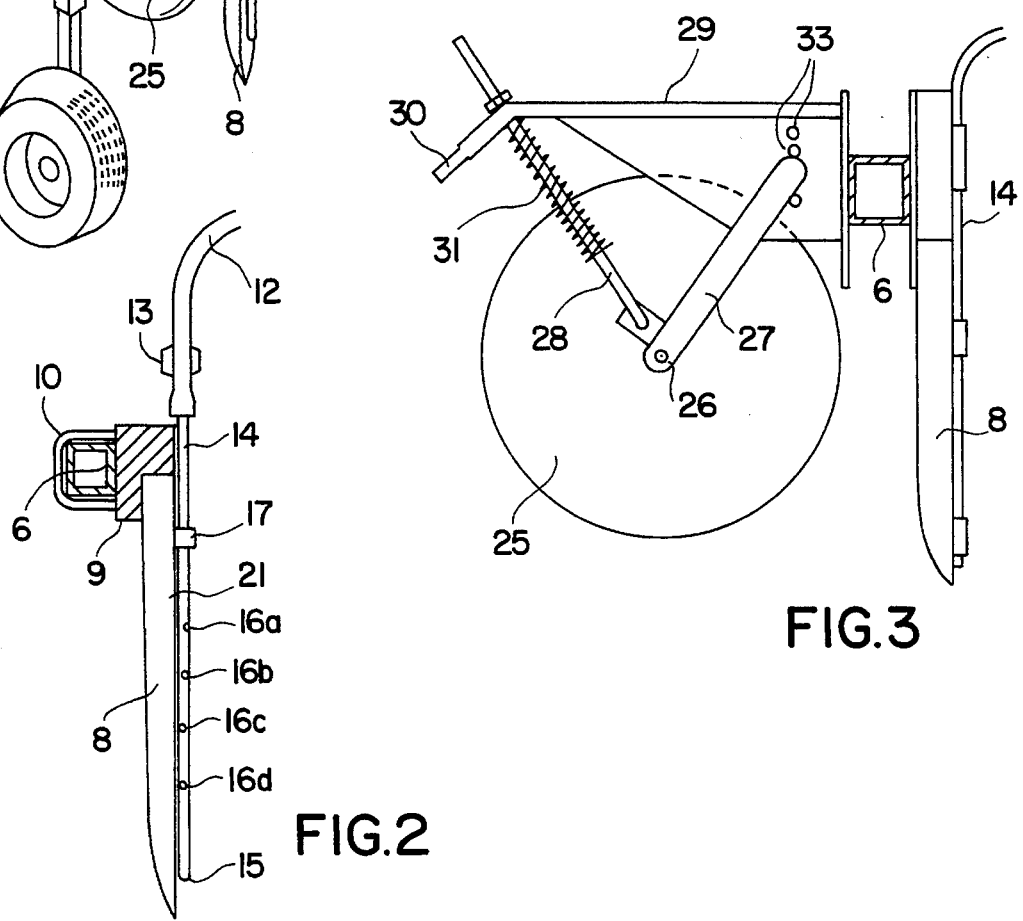
FIG. 2 is a sectional view of part of the machine of FIG. 1, illustrating an individual tine and its mounting to the chassis of the machine, but not showing the associated cutting disc.

A preferred embodiment of the present invention will now be more particularly described by way of example and with reference to FIGS. 1, 2 and 3 of the accompanying drawings.

Referring to FIG. 1, the cultivator-injector machine essentially comprises a chassis coupleable to the front of a tractor by three couplings 4 and carrying a series of vertical tines 8 each preceded by a freely rotating cutting disc 25. The chassis includes a central cage 1 having a pair of booms 2, one boom 2 extending from each side of the cage 1 (only one of the booms 2 is illustrated in detail in FIG. 1). Each of the booms 2 takes the form of an A-frame, the base ends of which are mounted via pivotal links 3 to the base of the central cage 1. The booms 2 may be retracted upwardly and inwardly towards the cage 1 by action of a pair of hydraulic pistons 5, one mounted of each side of an upper beam 18 of the cage 1.

The tines 8 and disc 25 are borne on subsidiary booms 6. Three subsidiary booms 6a, 6b, 6c (See FIG. 4) are provided on the illustrated cultivator-injector sufficient to cover three beds. Each sub-boom 6 comprises a single beam pivotally mounted at its centre to the cage 1 or a lateral boom 2 of the chassis. One sub-boom 6a is mounted to the front end, in use, of the chassis and the other two sub-booms 6b, 6c are each mounted to a respective one of the two lateral booms 2. The arrangement is such that the tines are suitably spaced across the cultivator. Each end of each sub-boom 6 has a telescopically-adjustable wheel-bearing leg 7 severably mounted thereto. Three 70 cm long vertical tines 8 each no more than 25 mm wide are severably mounted between the ends of each sub-boom 6. The tines 8 are fitted to the rearward, in use, side of the sub-boom 6 in a symmetrical array. The central one of the three tines 8 is affixed to the rearward base of a forwardly projecting hoop 20 provided centrally on the sub-boom 6 adjacent the pivotal link mounting the sub-boom 6 to the main part of the chassis. Each tine 8 is held in place by a pair of sacrificial hoops 10 fitted to a mounting block 9 at the top of the tine 8 by sacrificial bolts. The hoops 10 prevent substantial damage to the equipment should the tine 8 become jammed in the ground whilst in use. Similar hoops hold the wheel-bearing legs 7 to the ends of the sub-booms 6.

The free-turning cutting discs 25, as detailed in FIG. 3, are planar discs each mounted to a boom 6a, 6b, 6c of the chassis such as to be closely in front of and substantially axially aligned with a respective tine along the axis of ploughing motion of the machine (i.e. the plane in which the cutting rim of the disc 25 lies is substantially the same as the plane in which the leading edge of the tine 8 lies.)

The mounting of each disc 25 is variably adjustable in the axis of ploughing motion and in the vertical axis. The axle 26 about which the disc 25 turns is supported by a pair of arms 27, 28. The first arm 27 is adjustably pivotally mounted to a bracket 29 via one of a column of holes 33 therein. A pivot pin 32 at the upper most, in use, end of the first arm 27 is slideably and pivotally located in the hole 33. The bracket 29 to which the first arm 27 is mounted is, in turn, adjustably mounted to the boom 6.

The second arm 28 which supports the disc 25 extends upwardly, in use, from the journal supporting the axial 26 and slideably held at its upper, in use, end within a longitudinal slot in a front-most, in use, downward extension 30 of the bracket 29. A compression spring 31 abuts the portion 30 of the bracket 29 to bias the cutting disc 25 toward the ground, in use. The spring 31 may be set at a range of compressed states to adjust the biasing force.

The fluid delivery system of the machine comprises three main fluid supply lines 11 running from a fluid storage tank and pump (not illustrated). The tank and pressurising pump may be of any suitable type selected by the skilled reader and need not be further described.

The main fluid supply lines 11 branch into individual supply lines 12 feeding to each tine 8. As shown in FIG. 2, the end of each branch supply line 12 adjacent to the tine 8 is fitted to an upper end of a pipe 14 extending vertically down the rear base of the vertical tine 8. The delivery pipe 14 is a rigid robust plastic or metal pipe fixed to the tine by releasable clamps 17 and having a tap 13 at its upper end to control flow from the supply line 12, and a closed lower end 15. A series of 1 mm diameter lateral, or radial, apertures 16a, 16b and 16c are provided through the wall of the delivery pipe 14. These apertures are strategically arrayed. They are each spaced down the pipe 14 at a predetermined height relative to the tip of the tine 8 and are each oriented at a predetermined angle of between about 45 degrees and about 75 degrees to the ploughing axis (the axis perpendicular to the flat rearward face 21 of the tine 8). The three lateral apertures 6a, 6b, 6c of the delivery pipe 14 illustrated in FIG. 2 are alternately positioned to the left and to the right of the ploughing axis.

To make use of the above-described cultivator-injector machine to delivery agrochemicals to—a field the machine is shackled to the front of a powered vehicle, such as a modified tractor of the type known as a tool carrier, by means of the couplings 4. The main supply lines 11 are connected to a pump and storage tank on board the powered vehicle. The tines 8 which are fitted to the machine, or rather the associated pipes 14, are selected for a specific array of lateral apertures to suit a particular agrochemical to be applied to the field. The depth of soil penetration of the tines 8 is adjusted to suit the desired pattern of application commonly this involves a 15 cm depth penetration at sowing increasing to 30 cm as the crop grows. This adjustment is most simply effected by altering the height of the legs 7. In transit to the field to be cultivated the booms 2 are raised by the pistons 5. The booms 2 are then lowered again once the destination field is reached. The cultivation-injection procedure is initiated by activating the pumps to pressurise the stored fluid to pressures of the order of 1 bar. Supply taps and delivery taps 13 are then opened to enable flow of fluid down the main and branch supply lines 11, 12 to the delivery pipes 14 and thence out through the lateral apertures 16 in a predetermined pattern of jets. Once the jet-pattern has been established, the machine may be pushed across the field with the discs 25 slicing through obstructive vegetation and detritus ahead of the tines 8 ploughing through the soil. Contours of the land are accommodated by the pivotal mounting of the sub-booms 6 so that the depth of soil penetrated by the tines 8 is maintained substantially constant. As the machine ploughs across the field, the jets of fluid emanating from behind the tines 8 penetrate the soil ridges to each side of the tines 8.

The machine can be used not only before and during sowing of the crop, but also during growth of the crop. The machine is adapted to be driven through rows of crop with the tines 8 passing between the rows and the delivery pipes 14 injecting agrochemicals—into the soil immediately around the roots of the crop to each side of the tines 8.

Field trials of the machine to date have clearly demonstrated its ability to accurately delivery pesticides—systemic insecticides to carrots and parsnips, necessitating use of much less of the agrochemicals (commonly using volumes ⅓ or ¼ that normally required). Very significant benefits have been obtained in using the machine to dose carrots and parsnips with a metalaxyl-based compound sold by Ciba-Geigy Plc under the trademark Fubol to reduce cavity spot disease. Not only does repeated use of the machine throughout growth of the crop greatly enhance effectiveness of the treatment over and above conventional spraying, but the machine also reduces physical crop damage at harvesting, apparently by virtue of the fact that it serves to keep the soil between rows of crop friable until harvesting.

Although the present invention has been described above with reference to a preferred embodiment, numerous other embodiments are possible. For example, the delivery pipe 14 may be formed integrally with the rearward surface 12 of the tine 8. Alternatively, the delivery pipe 14 may be conveniently separable from the tine 8 and supply line 12, to enable replacement of the pipe 14 alone, rather than replacing the combined tine 8 and pipe 14, whenever a different application pattern is required. More than one delivery pipe may be fitted to a single tine if desired. The lateral apertures 16 of the delivery pipes 14 need not be angled at between 45 degrees and 75 degrees to the ploughing axis.

We claim:

1. A cultivator-injector machine for sub-surface application of a fluid pesticide to a field of root crop grown in rows forming soil ridges carrying said root crop separated by furrows, which machine comprises: means for delivering said pesticide to said soil ridges from said furrows comprising a chassis carrying a plurality of times, each said tine having at least one fluid delivery pipe mounted therein extending longitudinally down a rearward, in use, face thereof, each said delivery pipe having a closed lower end and at least one lateral aperture therein facing rearwardly, in use, at an angle to the axis of ploughing motion so as to direct said pesticide toward said rows of root crop, said chassis further carrying at least one free-turning cutting disc, each mounted closely in front of and substantially aligned with a respective tine along the axis of ploughing motion of the machine, said machine being thereby adapted for repeated passage through the field of root crop grown in rows as the crop grows, the tines being substantially straight and spaced apart to pass between said rows of root crop and the machine being mounted to the front of a powered vehicle, in use, said machine further having a delivery pump means to pressurize said fluid pesticide to thereby laterally pump said fluid pesticide out of said lateral aperture of said delivery pump means to the roots of the root crop.

2. A machine as claimed in claim 1, wherein each tine is a vertical tine.

3. A machine as claimed in claim 2, wherein said plurality of lateral apertures of each said delivery pipe are alternately positioned to the right and to the left of the ploughing axis.

4. A machine as claimed in claim 1 wherein each tine is no more than 25 mm in width.

5. A machine as claimed in claim 1 wherein each said lateral aperture of each delivery pipe are between 0.25 and 2 mm in diameter.

6. A machine as claimed in claim 1 wherein each said lateral aperture is at an angle of between 45 degrees and 75 degrees to the axis of ploughing motion.

7. A machine as claimed in claim 1 wherein the mounting of the cutting disc to the chassis enables the disc to be adjustably positioned relative to the respective tine.

8. A machine as claimed in claim 1 wherein the disc is independently adjustably biased into the ground, in use.

9. A machine as claimed in claim 1, wherein said chassis carries a plurality of said tines.

10. A machine as claimed in claim 1, wherein said delivery pipe has a plurality of lateral apertures.

11. A machine as claimed in claim 1, wherein each said delivery pipe has a plurality of lateral apertures longitudinally spaced apart along the length of said delivery pipe.

12. A machine as claimed in claim 1, wherein said chassis further comprises a plurality of wheels positioned to pass between said field of root crop grown in rows and said plurality of tines bearing said delivery pipes are positioned along said chassis relative to said plurality of wheels such that said machine may pass through said field of root crop grown in rows and laterally inject said fluid pesticide into the soil adjacent to said roots of said field of root crop grown in rows without damage thereto.

13. A method of sub-surface application of a pesticide to a field of root crop growing in rows, which method comprises the steps of:

(a) providing a cultivator-injector machine for sub-surface application of a fluid pesticide to a field, which machine comprises a chassis carrying a plurality of tines, each said tine having at least one fluid delivery pipe mounted thereon extending longitudinally down a rearward, in use, face thereof, each said delivery pipe having a closed lower end at least one lateral aperture therein facing rearwardly, in use, at an angle to the axis of ploughing motion, said chassis further carrying at least one free-turning cutting disc, each mounted closely in front of and substantially aligned with a respective tine along the axis of ploughing motion of the machine, said machine being adapted for repeated passage through the field of root crop grown in rows as the crop grows, the tines being substantially straight and spaced apart to pass between said rows of root crop and said lateral aperture therein facing rearwardly and the machine being mounted to the front of a powered vehicle, in use, said machine further having a delivery pump means to pressurize said fluid pesticide to thereby laterally pump said fluid pesticide out of said lateral aperture of said delivery pump means to the roots of the root crop;

(b) establishing communication between said delivery pipe and a pressurised supply of fluid pesticide; and (c) moving the chassis along the field of the growing crop ahead of the powered vehicle with the cutting disc parting obstructive vegetation ahead of the tine with the tine ploughing the soil between the rows of the crop and with the delivery pipe, via the lateral aperture therein, injecting fluid pesticide into the soil ridges.

14. A method of sub-surface application according to claim 13, wherein said pesticide is a metalaxyl-based compound to reduce the incidence of cavity spot disease, said method further comprises repeating steps 1, 2, and 3 at intervals through the growth of the crop, said crop selected from the group consisting of parsnip and carrot crop.

15. A method of treating parsnip or carrot crop growing in rows in a field with a metalaxyl-based compound to reduce the incidence of cavity spots disease, which method comprises the steps of:

(a) providing a cultivator-injector machine for sub-surface application of a fluid pesticide to a field, which machine comprises a chassis carrying at least one tine, each said tine having at least one fluid delivery pipe mounted thereon extending longitudinally down a rearward, in use, face thereof, each said delivery pipe having a closed lower end and at least one lateral aperture therein facing rearwardly, in use, at an angle to the axis of ploughing motion, said chassis further carrying at least one free-turning cutting disc, each mounted closely in front of and substantially aligned with a respective tine along the axis of ploughing motion of the machine, said machine being adapted for repeated passage through a field of root crop as the crop grows, the tine being substantially straight and the machine being mounted to the front of a powered vehicle, in use;

(b) establishing communication between said delivery pipe and a pressurised supply of fluid pesticide containing a metalaxyl-based compound;

(c) moving the chassis along the field of the growing crop ahead of the powered vehicle with the cutting disc parting obstructive vegetation ahead of the tine with the tine ploughing the soil between the rows of the crop and with the delivery pipe, via the lateral aperture therein, injecting fluid pesticide into the soil ridges; and (d) repeating the treatment at intervals throughout growth of the crop.

16. A method as claimed in claim 15, wherein treatment is commenced at ninety days post-sowing and repeated at thirty day intervals thereafter.

* * * * *